(12) United States Patent
Turner

(10) Patent No.: US 11,785,298 B2
(45) Date of Patent: Oct. 10, 2023

(54) AUTOMATIC REPLACEMENT OF MEDIA CONTENT ASSOCIATED WITH A REAL-TIME BROADCAST

(71) Applicant: INTERNATIONAL BUSINESS MACHINES CORPORATION, Armonk, NY (US)

(72) Inventor: James Martin Turner, Derry, NH (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 17/477,647

(22) Filed: Sep. 17, 2021

(65) Prior Publication Data

US 2023/0085683 A1 Mar. 23, 2023

(51) Int. Cl.
*H04N 21/454* (2011.01)
*G10L 15/22* (2006.01)
*G06F 40/205* (2020.01)
*G06F 40/237* (2020.01)

(52) U.S. Cl.
CPC ....... *H04N 21/4542* (2013.01); *G06F 40/205* (2020.01); *G06F 40/237* (2020.01); *G10L 15/22* (2013.01)

(58) Field of Classification Search
None
See application file for complete search history.

(56) References Cited

U.S. PATENT DOCUMENTS

| 6,075,550 | A | 6/2000 | Lapierre |
| 7,437,290 | B2 | 10/2008 | Danieli |
| 7,779,058 | B2 | 8/2010 | Shea |
| 9,401,943 | B2 * | 7/2016 | LaVoie ................ H04N 21/233 |

(Continued)

OTHER PUBLICATIONS

Barradas, et al., "On the Unobservability of Multimedia-Based Covert Channels for Internet Censorship Circumvention," Semantic Scholar [paper], 2020, 37 pages, Retrieved from the Internet: <URL: https://www.semanticscholar.org/paper/On-the-unobservability-of-multimedia-based-covert-Barradas-Santos/2feb3dc8950bcf89095ee456c4fb758ea3170e80>.

(Continued)

*Primary Examiner* — Omar S Parra
(74) *Attorney, Agent, or Firm* — Steven M. Bouknight

(57) ABSTRACT

A method for automatically replacing a first type of content associated with a real-time broadcast with a second type of content is provided. The method may include automatically parsing media content associated with the real-time broadcast and assigning timecode to the parsed media content. The method may further include determining whether the parsed media content includes the first type of content. The method may further include, in response to determining the parsed media content includes the first type of content, automatically determining a context associated with the first type of content. The method may further include automatically identifying the second type of content that matches the determined context. The method may also include, automatically replacing the first type of content in the parsed media content with the second type of content. The method may further include automatically presenting the real-time broadcast with the second type of content.

20 Claims, 5 Drawing Sheets

(56) References Cited

U.S. PATENT DOCUMENTS

| | | | |
|---|---|---|---|
| 2002/0147782 A1* | 10/2002 | Dimitrova | H04N 21/4394 709/207 |
| 2006/0095262 A1 | 5/2006 | Danieli | |
| 2008/0228821 A1 | 9/2008 | Shea | |
| 2019/0230387 A1* | 7/2019 | Gersten | G06F 16/783 |
| 2020/0260129 A1 | 8/2020 | Strein et al. | |
| 2021/0183366 A1* | 6/2021 | Reinspach | G10L 15/22 |
| 2021/0275928 A1 | 9/2021 | Ashoori et al. | |

OTHER PUBLICATIONS

Disclosed Anonymously, "Contextual Content Censoring," IP.com, Oct. 4, 2019, 4 pages, IP.com No. IPCOM000259972D, Retrieved from the Internet: <URL: https://priorart.ip.com/IPCOM/000259972>.

Disclosed Anonymously, "Method and Process for Spoiler Detection and Avoidance," IP.com, Dec. 10, 2020, 7 Pages, IP.com No. IPCOM000264400D, Retrieved from the Internet: <URL: https://priorart.ip.com/IPCOM/000264400>.

Disclosed Anonymously, "Method and System for Providing Contextually Personalized Audio Stream to each Viewer in Multi-Person TV Viewing Set-Up," IP.com, Oct. 3, 2018, 3 pages, IP.com No. IPCOM000255603D, Retrieved from the Internet: <URL: https://priorart.ip.com/IPCOM/000255603>.

ECPAT International, "Trends in online child sexual abuse material,": ECPAT International, Apr. 2018, 44 pages, Retrieved from the Internet: <URL: https://www.ecpat.org/wp-content/uploads/2018/07/ECPAT-International-Report-Trends-in-Online-Child-Sexual-Abuse-Material-2018.pdf>.

Mell et al., "The NIST Definition of Cloud Computing", Recommendations of the National Institute of Standards and Technology, NIST Special Publication 800-145, Sep. 2011, 7 pages.

International Search Report and Written Opinion, International Application No. PCT/EP2022/075394, filed Sep. 13, 2022, dated Dec. 22, 2022, 10 pages.

* cited by examiner

AUTOMATIC REPLACEMENT OF MEDIA CONTENT ASSOCIATED WITH A REAL-TIME BROADCAST

BACKGROUND

The present invention relates generally to the field of computing, and more specifically, to automatically replacing certain media content associated with a real-time broadcast.

Generally, in many countries, certain words and/or phrases may be censored on different types of media platforms. For example, in the United States, certain indecent and/or classified information and terms may be banned and/or censored by regulations implemented by the Federal Communication Commission (FCC), a government entity that regulates communications by radio, television, wire, satellite, and cable across the United States. Typically, a bleep censor may be used as a replacement of the indecent or classified content that is in question whereby a beep sound (usually about the sound of a 1000 Hz tone) is used to remove the questionable content in television and radio. Bleeping has been used for many years as a means of censoring TV and radio programs to remove content not deemed suitable for family, daytime, broadcasting, or international viewing, as well as to remove sensitive classified information for security. The bleep censor typically includes a software module that is manually operated by a broadcast technician. A bleep is also sometimes accompanied by a digital blur or box over a speaker's mouth in cases where the removed speech may still be easily understood by lip reading. On closed caption subtitling, bleeped words are usually replaced by "[bleep]" or sometimes by the phrases "[expletive]", "[beep]" "[censored]", "[explicit]" or may occasionally include hyphens, asterisks, or other non-letter symbols to represent abbreviations of the term or phrase in question.

SUMMARY

A method for automatically replacing a first type of content associated with a real-time broadcast with a second type of content is provided. The method may include, in response to receiving the real-time broadcast, automatically parsing media content associated with the real-time broadcast and assigning timecode to the parsed media content. The method may further include determining whether the parsed media content includes the first type of content using speech-to-text and natural language processing algorithms. The method may further include, in response to determining the parsed media content includes the first type of content, automatically determining a context associated with the first type of content using the speech-to-text and the natural language processing algorithms. The method may further include, based on the determined context, automatically identifying the second type of content that matches the determined context and replaces the first type of content. The method may also include, in response to identifying the second type of content, automatically replacing the first type of content in the parsed media content with the second type of content, whereby replacing the first type of content with the second type of content comprises automatically removing the first type of content in a closed captioning system and in audio content associated with the real-time broadcast and inserting the second type of content in the closed captioning system and the audio content in place of the first type of content. The method may further include automatically presenting the real-time broadcast with the second type of content.

A computer system for automatically replacing a first type of content associated with a real-time broadcast with a second type of content is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include, in response to receiving the real-time broadcast, automatically parsing media content associated with the real-time broadcast and assigning timecode to the parsed media content. The method may further include determining whether the parsed media content includes the first type of content using speech-to-text and natural language processing algorithms. The method may further include, in response to determining the parsed media content includes the first type of content, automatically determining a context associated with the first type of content using the speech-to-text and the natural language processing algorithms. The method may further include, based on the determined context, automatically identifying the second type of content that matches the determined context and replaces the first type of content. The method may also include, in response to identifying the second type of content, automatically replacing the first type of content in the parsed media content with the second type of content, whereby replacing the first type of content with the second type of content comprises automatically removing the first type of content in a closed captioning system and in audio content associated with the real-time broadcast and inserting the second type of content in the closed captioning system and the audio content in place of the first type of content. The method may further include automatically presenting the real-time broadcast with the second type of content.

A computer program product for automatically replacing a first type of content associated with a real-time broadcast with a second type of content is provided. The computer program product may include one or more computer-readable storage devices and program instructions stored on at least one of the one or more tangible storage devices, the program instructions executable by a processor. The computer program product may include program instructions to, in response to receiving the real-time broadcast, automatically parse media content associated with the real-time broadcast and assign timecode to the parsed media content. The computer program product may also include program instructions to determine whether the parsed media content includes the first type of content using speech-to-text and natural language processing algorithms. The computer program product may further include program instructions to, in response to determining the parsed media content includes the first type of content, automatically determining a context associated with the first type of content using the speech-to-text and the natural language processing algorithms. The computer program product may also include program instructions to, based on the determined context, automatically identify the second type of content that matches the determined context and replaces the first type of content. The computer program product may further include program instructions to, in response to identifying the second type of content, automatically replace the first type of content in the parsed media content with the second type of content, whereby replacing the first type of content with the second type of content comprises automatically removing the first type of content in a closed captioning system and in audio content associated with the real-time broadcast and inserting the second type of content in the closed captioning system and the audio content in place of the first type of content. The computer program product may include program instructions to automatically present the real-time broadcast with the second type of content.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
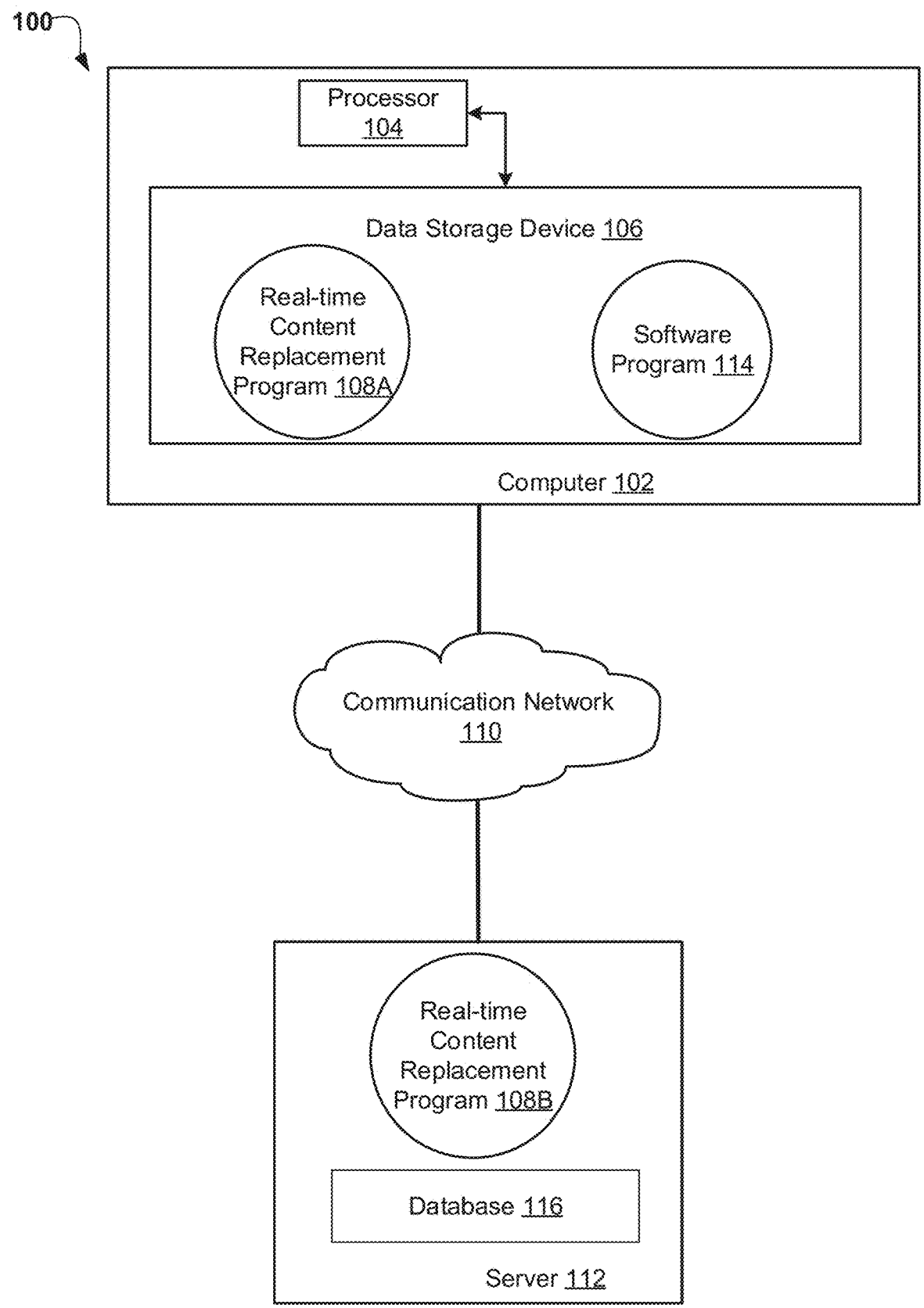
FIG. 1 illustrates a networked computer environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate generally to the field of computing, and more particularly, to automatic replacement of media content associated with a real-time broadcast. Specifically, the following described exemplary embodiments provide a method, system, and computer program product for automatically and cognitively removing (and/or censoring) objectionable content associated with media content of a real-time broadcast/stream, and replacing the objectionable content with content that matches a context and/or tone associated with the objectionable content. Therefore, the exemplary embodiments have the capacity to improve the technical field associated with digital streaming and broadcasting by preventing a presence (i.e. a display and/or audio) of objectionable content in a real-time broadcast/stream. More specifically, in response to identifying objectionable content, the method, computer system, and computer program product may determine a context and tone associated with the objectionable content. Furthermore, based on the determined context and tone, the method, computer system, and computer program product may identify replacement content to replace the identified objectionable content. In turn, the method, computer system, and computer program product may replace the identified objectionable content with the replacement content by inserting the replacement content into the real-time broadcast/stream in place of the objectionable content.

As previously described with respect to media broadcasts, bleeping has been used for many years as a means of censoring TV and radio programs to remove content not deemed suitable for family, daytime, broadcasting, or international viewing, as well as to remove sensitive classified information for security. However, while bleeping makes it easier to censor certain content associated with scripted broadcasts, a long-standing problem has existed with live (i.e. real-time) television, radio, or streaming broadcasts that are unscripted whereby participants (such as athletes, guests, or members of an audience) may extemporaneously utter objectionable content. Furthermore, while a typical practice may include employing a time delay for a broadcast, a human being is oftentimes still tasked with pressing a button to simply beep over the content in question which can be both expensive, error prone, and annoying. Similarly, with closed captioning, a typical practice may include identifying the objectional material in the closed captioning system, however, merely replacing bleeped words with phrases such as "[expletive]", "[beep]" "[censored]", and "[explicit]", or occasionally including hyphens, asterisks, or other non-letter symbols to represent abbreviations of the term or phrase in question.

As such, it may be advantageous, among other things, to provide a method, computer system, and computer program product for automatically replacing a first type of content associated with a real-time broadcast with a second type of content. More specifically, the method, computer system, and computer program product may automatically and cognitively remove (and/or censor) objectionable content (first type of content) associated with media content of a real-time broadcast/stream, and replace the objectionable content with non-objectionable content (second type of content) that matches a context and tone associated with the objectionable content. Specifically, in response to receiving a real-time broadcast, the method, computer system, and computer program product may automatically parse media content associated with the real-time broadcast and assign timecode to the parsed media content. Furthermore, the method, computer system, and computer program product may determine whether the parsed media content includes objectionable content. Thereafter, in response to identifying objectionable content, the method, computer system, and computer program product may determine a context and tone associated with the objectionable content. Furthermore, based on the determined context and tone, the method, computer system, and computer program product may identify replacement content to replace the identified objectionable content. In turn, the method, computer system, and computer program product may replace the identified objectionable content with the replacement content by inserting the replacement content into the real-time broadcast in place of the objectionable content.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, an exemplary networked computer environment 100 in accordance with one embodiment is depicted. The networked computer environment 100 may include a computer 102 with a processor 104 and a data storage device 106 that is enabled to run a real-time content replacement program 108A and a software program 114, and may also include a microphone (not shown). The software program 114 may include one or multiple application programs such as a broadcasting program, streaming program, internet program, and/or one or more mobile apps running on a computer 102. The real-time content replacement program 108A may communicate with the software program 114. The networked computer environment 100 may also include a server 112 that is enabled to run a real-time content replacement program 108B and the communication network 110. The networked computer environment 100 may include a plurality of computers 102 and servers 112, only one of which is shown for illustrative brevity. For example, the plurality of computers 102 may include a plurality of interconnected devices, such as a mobile phone, tablet, and laptop, associated with one or more users.

According to at least one implementation, the present embodiment may also include a database 116, which may be running on server 112. The communication network 110 may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

The computer 102 may communicate with server computer 112 via the communications network 110. The communications network 110 may include connections, such as wire, wireless communication links, or fiber optic cables. As will be discussed with reference to FIG. 3, server computer 112 may include internal components 710a and external components 750a, respectively, and client computer 102 may include internal components 710b and external components 750b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Computer 102 may be, for example, a mobile device, a telephone, a personal digital assistant, a netbook, a laptop computer, a tablet computer, a desktop computer, and internet of things (IoT) device, a set-top media device, or any type of computing device capable of running a program and accessing a network. According to various implementations of the present embodiment, the real-time content replacement program 108A, 108B may interact with a database 116 that may be embedded in various storage devices, such as, but not limited to, a mobile device 102, a networked server 112, or a cloud storage service.

According to the present embodiment, a program, such as a real-time content replacement program 108A and 108B may run on the computer 102 and/or on the server computer 112 via a communications network 110. The real-time content replacement program 108A, 108B may automatically and cognitively replace (and/or censor) objectionable content associated with a real-time broadcast/stream. Specifically, the computer 102, such as a set-top media device and/or mobile device, may run a real-time content replacement program 108A, 108B that may interact with a software program 114, such as a digital streaming application, to receive a real-time broadcast. In response to receiving the real-time broadcast, the real-time content replacement program 108A, 108B may automatically parse media content associated with the real-time broadcast and assign timecode to the parsed media content. Furthermore, the real-time content replacement program 108A, 108B may determine whether the parsed media content includes objectionable content. Thereafter, in response to identifying objectionable content, the real-time content replacement program 108A, 108B may determine a context and tone associated with the objectionable content. Furthermore, based on the determined context and tone, the real-time content replacement program 108A, 108B may identify replacement content to replace the identified objectionable content. In turn, the real-time content replacement program 108A, 108B may replace the identified objectionable content with the replacement content by inserting the replacement content into the real-time broadcast in place of the objectionable content.

Figure 2:
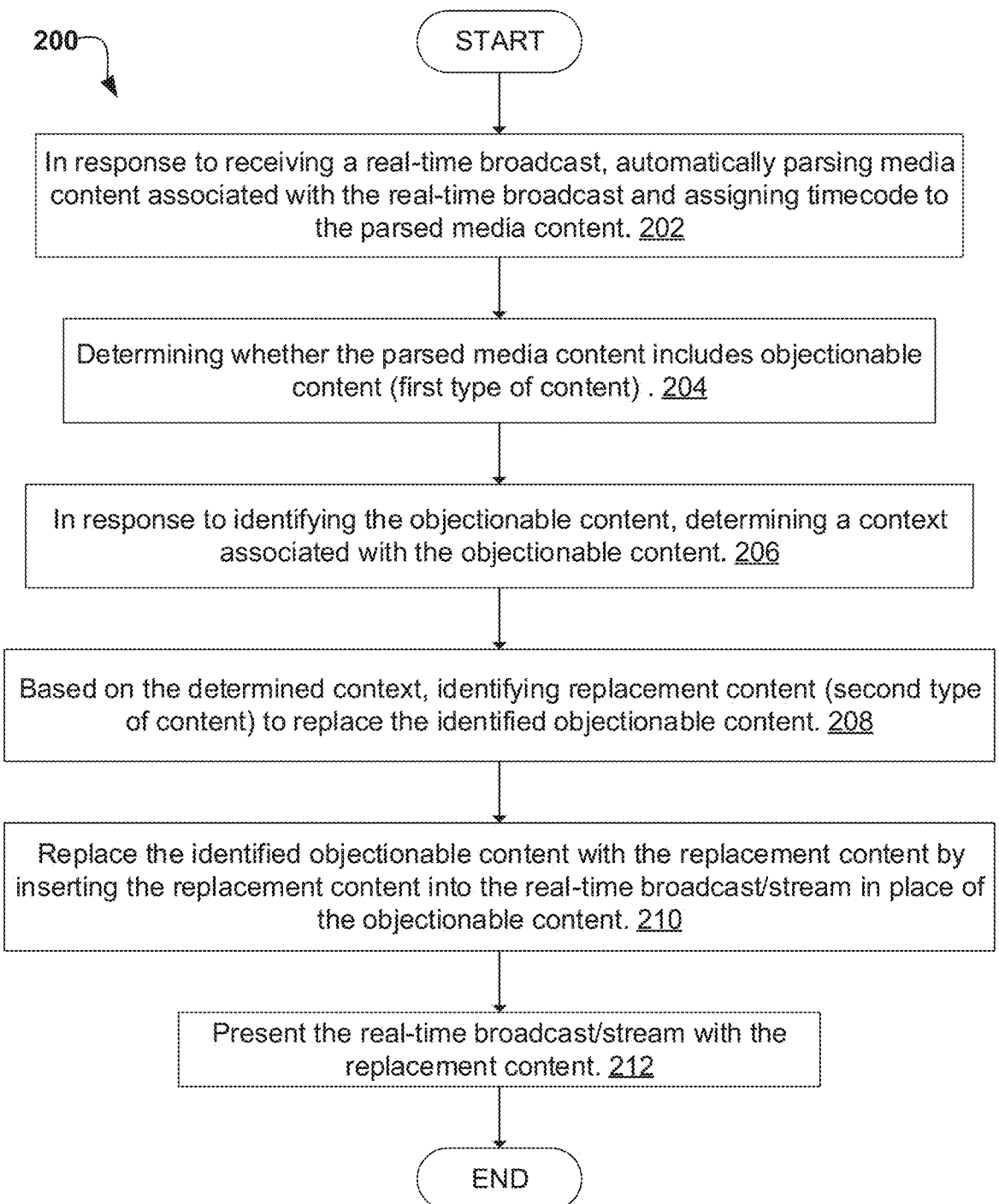
FIG. 2 is an operational flowchart illustrating the steps carried out by a program for automatically replacing a first type of content associated with a real-time broadcast with a second type of content according to one embodiment.

Referring now to FIG. 2, an operational flowchart 200 illustrating the steps carried out by the real-time content replacement program 108A, 108B for automatically and cognitively replacing a first type of content associated with a real-time broadcast with a second type of content according to one embodiment is depicted. Specifically, at 202, in response to receiving a real-time broadcast, the real-time content replacement program 108A, 108B may automatically parse media content associated with the real-time broadcast and assign timecode to the parsed media content. Specifically, and according to one embodiment, the real-time content replacement program 108A, 108B may parse the media content by using a demultiplexer to split the media content associated with the real-time broadcast/stream into video content and audio content. Furthermore, the real-time content replacement program 108A, 108B may further parse the video content into different time intervals and assign timecode to the different time intervals of the video content. Similarly, the real-time content replacement program 108A, 108B may further parse the audio content into different time intervals and assign timecode to the different time intervals of the audio content. Also, according to one embodiment, the real-time content replacement program 108A, 108B may automatically time delay the real-time broadcast/stream. More specifically, automatically time delaying the real-time broadcast/stream may include entering the audio content and the video content associated with the real-time broadcast/stream into a time delay system that is associated with the real-time content replacement program 108A, 108B (whereby a degree/length of the time delay may be dependent on an amount of time for performing the foregoing steps to the END, as described in FIG. 2, for processing the audio and video content such that replacement content is generated and presented for closed captioning and audio for the real-time broadcast/stream).

Thereafter, at 204, the real-time content replacement program 108A, 108B may determine whether the parsed media content includes objectionable content (first type of content). Specifically, according to one embodiment, the real-time content replacement program 108A, 108B may use speech-to-text and natural language processing (NLP) algorithms to identify terms and phrases associated with the video content and the audio content. Thereafter, the real-time content replacement program 108A, 108B may compare the identified terms and phrases to an electronic corpus of terms and phrases, whereby the corpus of terms/phrases may include objectionable terms/phrases as well as include replacement terms/phrases that may be used to replace the objectionable terms/phrases. According to one embodiment, the objectionable content (i.e. the objectionable terms/phrases) may, for example, include obscene or unfavorable terms/phrases, classified information, and/or other types of terms/phrases that may require censoring. Also, according to one embodiment, the real-time content replacement program 108A, 108B may receive the corpus of terms/phrases and/or may generate and update the corpus of terms/phrases using machine learning algorithms to, for example, automatically search the internet for terms and phrases that have been socially and/or publicly identified as objectionable and automatically add such terms to the electronic corpus. In turn, the real-time content replacement program 108A, 108B may compare an identified term/phrase to the corpus that includes the objectionable terms/phrases to identify whether the identified term/phrase matches an objectionable term/phrase among the objectionable terms and phrases.

Next, at 206, in response to identifying the objectionable content, the real-time content replacement program 108A, 108B may determine a context associated with the objectionable content. Specifically, for example, the real-time content replacement program 108A, 108B may determine a context associated with the objectionable content by using NLP algorithms to perform sentiment analysis, topic modeling, text summarization, etc. on the objectionable content as well text/speech surrounding the objectionable content. As such, the real-time content replacement program 108A, 108B may determine the context based on parts of the surrounding text/speech that immediately precede and follow the objectionable content and clarifies the meaning of the objectionable content.

Then, at 208, based on the determined context, the real-time content replacement program 108A, 108B may identify replacement content (second type of content) to replace the identified objectionable content. As previously described at step 204, the real-time content replacement program 108A, 108B may compare the identified terms and phrases of the parsed media content to a corpus of terms and phrases, whereby the corpus of terms/phrases may include objectionable terms/phrases as well as include replacement terms/phrases that may be used to replace the objectionable terms/phrases. According to one embodiment, an objectional term/phrase in the electronic corpus may have one or more replacement terms/phrases associated with the objectionable term/phrase. Also, as previously described at step 206, the real-time content replacement program 108A, 108B may determine the context of the objectionable content (i.e. the objectionable term/phrase) to, for example, identify a replacement term/phrase (among possibly multiple replacement terms/phrases) that may fit/match the context of the objectionable term/phrase. As such, based on the determined context, the real-time content replacement program 108A, 108B may identify replacement content (i.e. a replacement term/phrase) to replace the identified objectionable content. Specifically, and according to one embodiment, the real-time content replacement program 108A, 108B may again use NLP algorithms to identify the replacement content (i.e. a replacement term/phrase) that matches the determined context and replace the identified objectionable content. According to one embodiment, the replacement content may include content that is determined to be not objectionable by real-time content replacement program 108A, 108B, such as content that is determined to be not obscene, unfavorable, and/or classified.

Next, at 210, the real-time content replacement program 108A, 108B may replace the identified objectionable content with the replacement content by inserting the replacement content into the real-time broadcast/stream in place of the objectionable content. For example, for closed captioning associated with the real-time broadcast/stream, the real-time content replacement program 108A, 108B may replace the identified objectionable content with the replacement content by removing the objectionable term/phrase from displayed text associated with the closed captioning and inserting the replacement term/phrase into displayed text in place of the objectionable content. Furthermore, for the audio content associated with the real-time broadcast/stream, the real-time content replacement program 108A, 108B may use, for example, IBM® Watson® Speech to Text and Tone Analysis (IBM and all IBM-based trademarks and logos are trademarks or registered trademarks of International Business Machines Corporation and/or its affiliates) to determine a tone of the speech associated with the objectionable content when recited. For example, determining the tone of the speech may include determining a sound pitch and volume at which the objectionable content is recited. Therefore, based on the determined tone and using the IBM® Watson® Speech to Text and Tone Analysis, the real-time content replacement program 108A, 108B may generate and/or record a tone/speech that includes the replacement content and matches the tone associated with the objectionable content.

As such, when automatically replacing the objectionable content with the replacement content, the speech/sound of the replacement content may match the speech/sound of a speaker (or more specifically, match the speech/sound of the previously recited objectionable content). Furthermore, based on the assigned timecode as described at step 202, the real-time content replacement program 108A, 108B may determine the interval at which the objectionable content is uttered. For example, the real-time content replacement program 108A, 108B may determine a start timecode and an end timecode associated the objectionable content to determine when and at what length the objectionable content is uttered. Thus, in response to determining the start and end timecodes, the real-time content replacement program 108A, 108B may remove the audio content included and between the start and end timecodes, whereby the audio content corresponds to the objectionable content, and replace that audio with audio/speech content that includes the replacement content (whereby the audio of the replacement content matches the tone of the objectionable content). As such, the real-time content replacement program 108A, 108B may time-match a length of the replacement content to the length of the previously uttered objectionable content.

In turn, at 212, and according to one embodiment, the real-time content replacement program 108A, 108B may again use a multiplexer to recombine the audio content and the video content associated with the real-time broadcast/stream and present the real-time broadcast/stream with the replacement content.

It may be appreciated that FIGS. 1-2 provide only illustrations of one implementation and does not imply any limitations with regard to how different embodiments may be implemented. Many modifications to the depicted environments may be made based on design and implementation requirements.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 3:
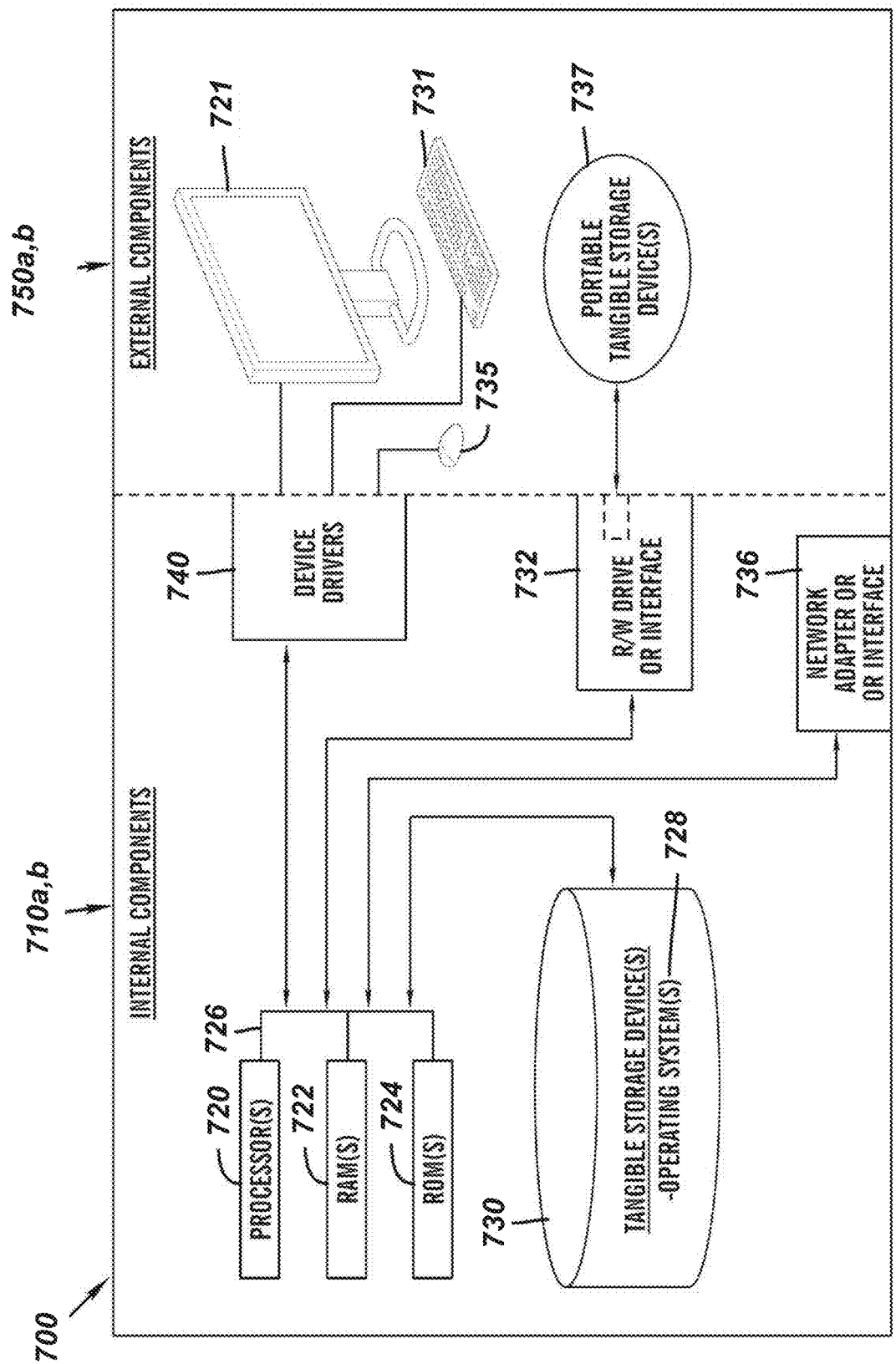
FIG. 3 is a block diagram of the system architecture of the program for automatically replacing a first type of content associated with a real-time broadcast with a second type of content according to one embodiment.

FIG. 3 is a block diagram 700 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 710 *a, b* and 750 *a, b* is representative of any electronic device capable of executing machine-readable program instructions that may include a computer 102 (710*a* and 750*a*) and/or a server 112 (710*b* and 750*b*). Data processing system 710 *a, b* and 750 *a, b* may be representative of a smart phone, a computer system, PDA, or other electronic devices. Examples of computing systems, environments, and/or configurations that may represented by data processing system 710 a, b and 750 a, b may include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) include respective sets of internal components 710 a, b and external components 750 a, b illustrated in FIG. 3. Each of the sets of internal components 710 a, b includes one or more processors 720, one or more computer-readable RAMs 722, and one or more computer-readable ROMs 724 on one or more buses 726, and one or more operating systems 728 and one or more computer-readable tangible storage devices 730. The one or more operating systems 728, the software program 114 (FIG. 1) and the Real-time content replacement program 108A (FIG. 1) in client computer 102 (FIG. 1), and the Real-time content replacement program 108B (FIG. 1) in network server computer 112 (FIG. 1) are stored on one or more of the respective computer-readable tangible storage devices 730 for execution by one or more of the respective processors 720 via one or more of the respective RAMs 722 (which typically include cache memory). In the embodiment illustrated in FIG. 3, each of the computer-readable tangible storage devices 730 is a magnetic disk storage device of an internal hard drive. Alternatively, each of the computer-readable tangible storage devices 730 is a semiconductor storage device such as ROM 724, EPROM, flash memory or any other computer-readable tangible storage device that can store a computer program and digital information.

Each set of internal components 710 a, b, also includes a R/W drive or interface 732 to read from and write to one or more portable computer-readable tangible storage devices 737 such as a CD-ROM, DVD, memory stick, magnetic tape, magnetic disk, optical disk or semiconductor storage device. A software program, such as a real-time content replacement program 108A and 108B (FIG. 1), can be stored on one or more of the respective portable computer-readable tangible storage devices 737, read via the respective R/W drive or interface 732, and loaded into the respective hard drive 730.

Each set of internal components 710 a, b also includes network adapters or interfaces 736 such as a TCP/IP adapter cards, wireless Wi-Fi interface cards, or 3G or 4G wireless interface cards or other wired or wireless communication links. The real-time content replacement program 108A (FIG. 1) and software program 114 (FIG. 1) in client computer 102 (FIG. 1), and the Real-time content replacement program 108B (FIG. 1) in network server 112 (FIG. 1) can be downloaded to client computer 102 (FIG. 1) from an external computer via a network (for example, the Internet, a local area network or other, wide area network) and respective network adapters or interfaces 736. From the network adapters or interfaces 736, the real-time content replacement program 108A (FIG. 1) and software program 114 (FIG. 1) in client computer 102 (FIG. 1) and the real-time content replacement program 108B (FIG. 1) in network server computer 112 (FIG. 1) are loaded into the respective hard drive 730. The network may comprise copper wires, optical fibers, wireless transmission, routers, firewalls, switches, gateway computers, and/or edge servers.

Each of the sets of external components 750 a, b can include a computer display monitor 721, a keyboard 731, and a computer mouse 735. External components 750 a, b can also include touch screens, virtual keyboards, touch pads, pointing devices, and other human interface devices. Each of the sets of internal components 710 a, b also includes device drivers 740 to interface to computer display monitor 721, keyboard 731, and computer mouse 735. The device drivers 740, R/W drive or interface 732, and network adapter or interface 736 comprise hardware and software (stored in storage device 730 and/or ROM 724).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
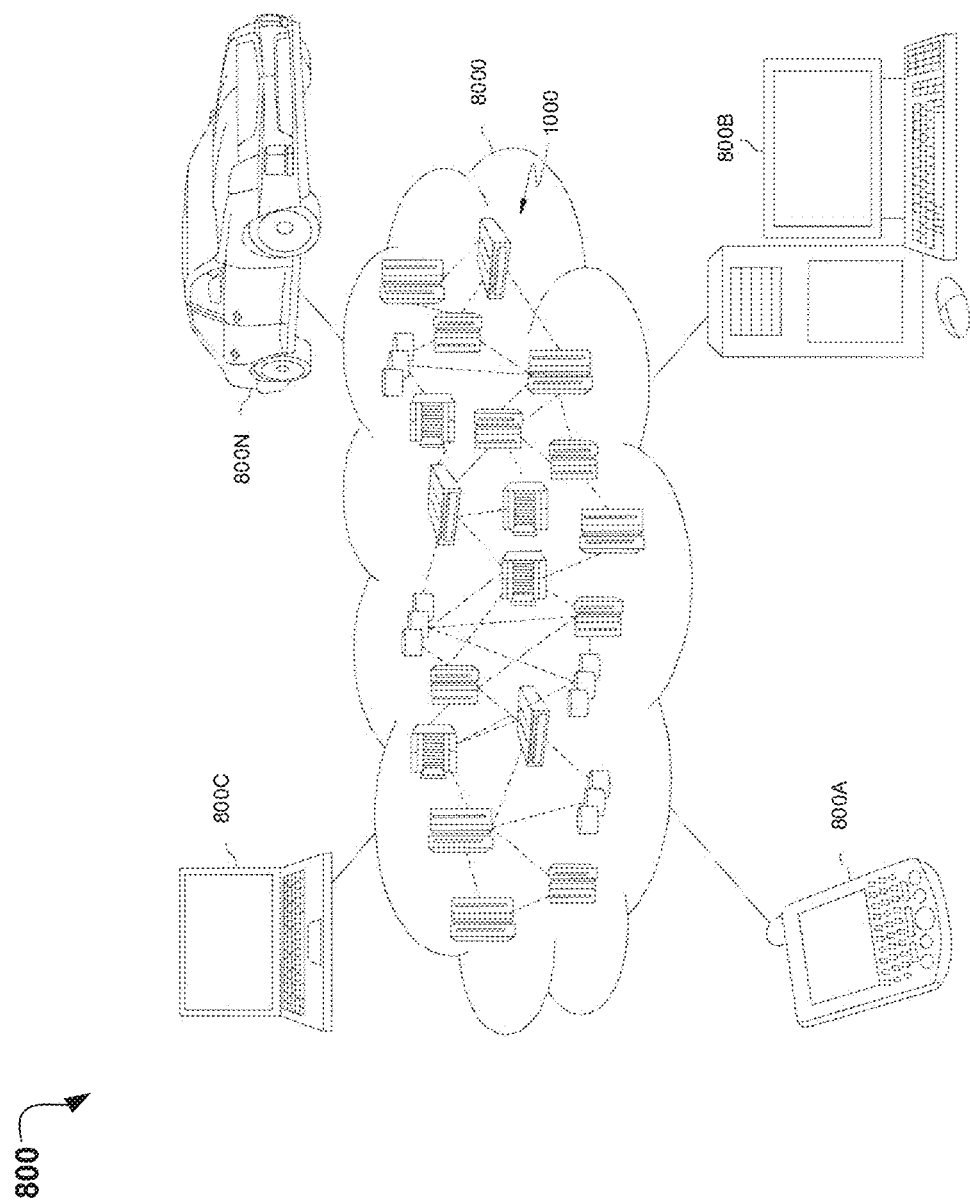
FIG. 4 is a block diagram of an illustrative cloud computing environment including the computer system depicted in FIG. 1, in accordance with an embodiment of the present disclosure.

Referring now to FIG. 4, illustrative cloud computing environment 800 is depicted. As shown, cloud computing environment 800 comprises one or more cloud computing nodes 1000 with which local computing devices used by cloud consumers, such as, for example, personal digital assistant (PDA) or cellular telephone 800A, desktop computer 800B, laptop computer 800C, and/or automobile computer system 800N may communicate. Nodes 1000 may communicate with one another. They may be grouped (not shown) physically or virtually, in one or more networks, such as Private, Community, Public, or Hybrid clouds as described hereinabove, or a combination thereof. This allows cloud 8000 to offer infrastructure, platforms and/or software as services for which a cloud consumer does not need to maintain resources on a local computing device. It is understood that the types of computing devices 800A-N shown in FIG. 4 are intended to be illustrative only and that computing nodes 100 and cloud 8000 can communicate with any type of computerized device over any type of network and/or network addressable connection (e.g., using a web browser).

Figure 5:
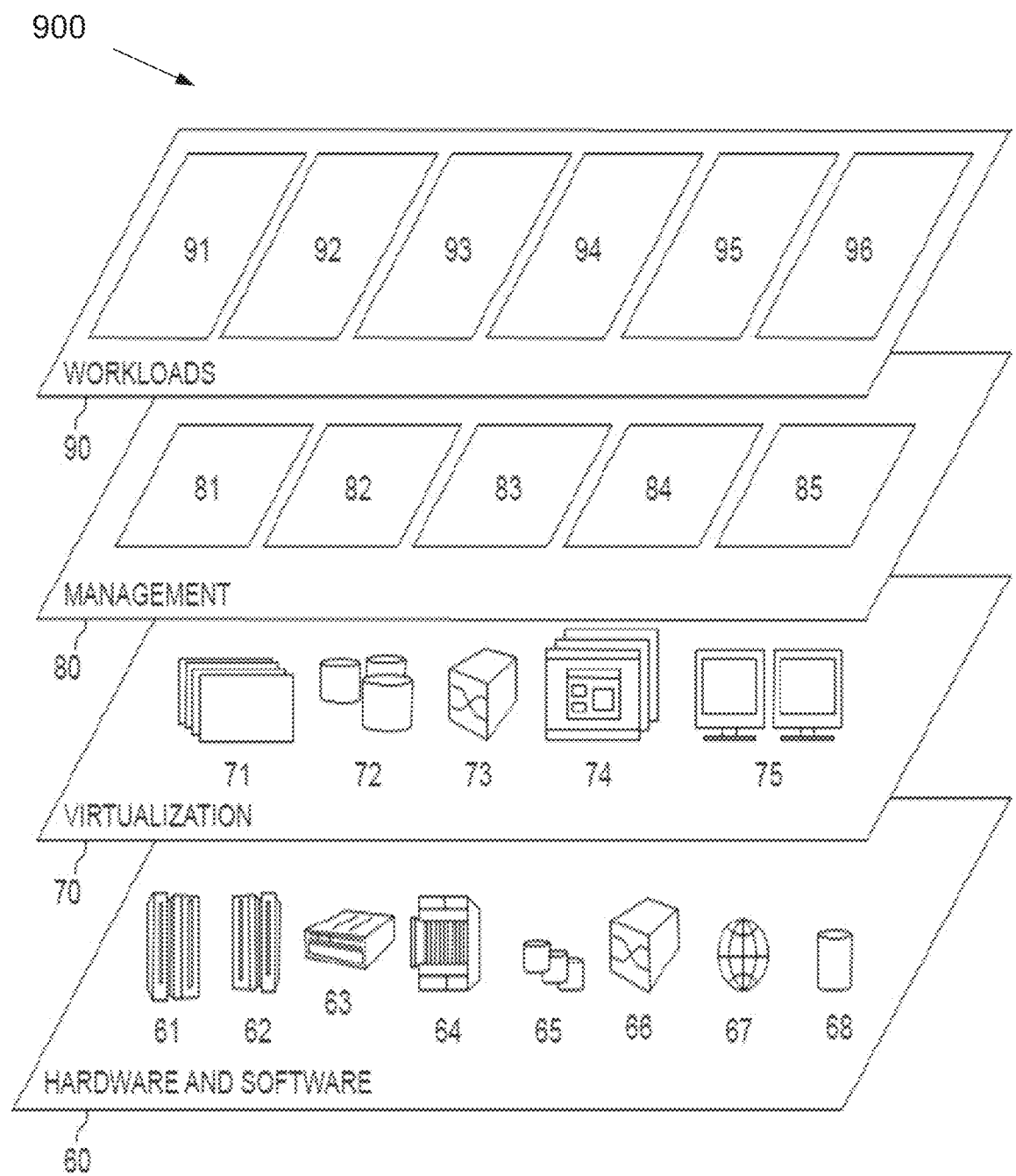
FIG. 5 is a block diagram of functional layers of the illustrative cloud computing environment of FIG. 4, in accordance with an embodiment of the present disclosure.

Referring now to FIG. 5, a set of functional abstraction layers 900 provided by cloud computing environment 800 (FIG. 4) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and Real-time content replacement 96. A real-time content replacement program 108A, 108B (FIG. 1) may be offered "as a service in the cloud" (i.e., Software as a Service (SaaS)) for applications running on computing devices 102 (FIG. 1) and may automatically remove objectionable content associated with media content of a real-time broadcast/stream and replace the objectionable content with content that matches a context and tone associated with the objectionable content.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for automatically replacing a first type of content associated with a real-time broadcast with a second type of content, comprising:

in response to receiving the real-time broadcast, automatically parsing media content associated with the real-time broadcast and assigning timecode to the parsed media content;

determining whether the parsed media content includes the first type of content using speech-to-text and natural language processing algorithms;

in response to determining the parsed media content includes the first type of content, automatically determining a context associated with the first type of content using the speech-to-text and the natural language processing algorithms by identifying parts of surrounding text and speech immediately preceding and following the first type of content;

based on the determined context, automatically identifying the second type of content that matches the determined context and replaces the first type of content;

in response to identifying the second type of content, automatically replacing the first type of content in the parsed media content with the second type of content, whereby replacing the first type of content with the second type of content comprises automatically removing the first type of content in a closed captioning system and in audio content associated with the real-time broadcast and inserting the second type of content in the closed captioning system and the audio content in place of the first type of content; and automatically presenting the real-time broadcast with the second type of content.

2. The computer-implemented method of claim 1, wherein automatically parsing the media content associated with the real-time broadcast and assigning the timecode to the parsed media content further comprises:

using a demultiplexer to split the media content associated with the real-time broadcast into video content and the audio content; and parsing the audio content and the video content into different time intervals and assigning the timecode to the different time intervals.

3. The computer-implemented method of claim 2, further comprising:

in response to receiving the real-time broadcast, automatically time delaying the real-time broadcast by entering the audio content and the video content associated with the real-time broadcast into a time delay system, wherein a degree of the time delaying is dependent on an amount of time for automatically processing and presenting the real-time broadcast with the second type of content.

4. The method of claim 1, wherein determining whether the parsed media content includes the first type of content, further comprises:

comparing the first type of content to an electronic corpus of terms and phrases; and determining whether the first type of content matches at least one term from the electronic corpus of terms and phrases.

5. The computer-implemented method of claim 1, wherein automatically determining a context associated with the first type of content further comprises:

using the speech-to-text and the natural language processing algorithms to identify parts of surrounding text and speech immediately preceding and following the first type of content for clarifying a meaning of the first type of content.

6. The computer-implemented method of claim 1, wherein automatically replacing the first type of content in the parsed media content with the second type of content further comprises:

determining a tone associated with the audio content of the first type of content;

determining a start time and an end time associated with the audio content of the first type of content;

generating a speech including the second type of content that matches the determined tone associated with the audio content of the first type of content; and automatically replacing the audio content of the first type of content with the generated speech from the second type of content, wherein the generated speech including the second type of content time-matches a length of the audio content of the first type of content based on the determined start time and the determined end time.

7. The computer-implemented method of claim 2, wherein automatically presenting the real-time broadcast with the second type of content further comprises:

using a multiplexer to recombine the video content and the audio content comprising the second type of content.

8. A computer system for automatically replacing a first type of content associated with a real-time broadcast with a second type of content, comprising:

one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:

in response to receiving the real-time broadcast, automatically parsing media content associated with the real-time broadcast and assigning timecode to the parsed media content;

determining whether the parsed media content includes the first type of content using speech-to-text and natural language processing algorithms;

in response to determining the parsed media content includes the first type of content, automatically determining a context associated with the first type of content using the speech-to-text and the natural language processing algorithms;

based on the determined context, automatically identifying the second type of content that matches the determined context and replaces the first type of content;

in response to identifying the second type of content, automatically replacing the first type of content in the parsed media content with the second type of content, whereby replacing the first type of content with the second type of content comprises automatically removing the first type of content in a closed captioning system and in audio content associated with the real-time broadcast and inserting the second type of content in the closed captioning system and the audio content in place of the first type of content; and automatically presenting the real-time broadcast with the second type of content.

9. The computer system of claim 8, wherein automatically parsing the media content associated with the real-time broadcast and assigning the timecode to the parsed media content further comprises:

using a demultiplexer to split the media content associated with the real-time broadcast into video content and the audio content; and parsing the audio content and the video content into different time intervals and assigning the timecode to the different time intervals.

10. The computer system of claim 9, further comprising:

in response to receiving the real-time broadcast, automatically time delaying the real-time broadcast by entering the audio content and the video content associated with the real-time broadcast into a time delay system, wherein a degree of the time delaying is dependent on an amount of time for automatically processing and presenting the real-time broadcast with the second type of content.

11. The computer system of claim 8, wherein determining whether the parsed media content includes the first type of content, further comprises:

comparing the first type of content to an electronic corpus of terms and phrases; and determining whether the first type of content matches at least one term from the electronic corpus of terms and phrases.

12. The computer system of claim 8, wherein automatically determining a context associated with the first type of content further comprises:

using the speech-to-text and the natural language processing algorithms to identify parts of surrounding text and speech immediately preceding and following the first type of content for clarifying a meaning of the first type of content.

13. The computer system of claim 12, wherein automatically replacing the first type of content in the parsed media content with the second type of content further comprises:

determining a tone associated with the audio content of the first type of content;

determining a start time and an end time associated with the audio content of the first type of content;

generating a speech including the second type of content that matches the determined tone associated with the audio content of the first type of content; and automatically replacing the audio content of the first type of content with the generated speech from the second type of content, wherein the generated speech including the second type of content time-matches a length of the audio content of the first type of content based on the determined start time and the determined end time.

14. The computer system of claim 9, wherein automatically presenting the real-time broadcast with the second type of content further comprises:

using a multiplexer to recombine the video content and the audio content comprising the second type of content.

15. A computer program product for automatically replacing a first type of content associated with a real-time broadcast with a second type of content, comprising:

one or more tangible computer-readable storage devices and program instructions stored on at least one of the one or more tangible computer-readable storage devices, the program instructions executable by a processor, the program instructions comprising:

in response to receiving the real-time broadcast, automatically parsing media content associated with the real-time broadcast and assigning timecode to the parsed media content;

determining whether the parsed media content includes the first type of content using speech-to-text and natural language processing algorithms;

in response to determining the parsed media content includes the first type of content, automatically determining a context associated with the first type of content using the speech-to-text and the natural language processing algorithms;

based on the determined context, automatically identifying the second type of content that matches the determined context and replaces the first type of content;

in response to identifying the second type of content, automatically replacing the first type of content in the parsed media content with the second type of content, whereby replacing the first type of content with the second type of content comprises automatically removing the first type of content in a closed captioning system and in audio content associated with the real-time broadcast and inserting the second type of content in the closed captioning system and the audio content in place of the first type of content; and automatically presenting the real-time broadcast with the second type of content.

16. The computer program product of claim 15, wherein automatically parsing the media content associated with the real-time broadcast and assigning the timecode to the parsed media content further comprises:

using a demultiplexer to split the media content associated with the real-time broadcast into video content and the audio content; and parsing the audio content and the video content into different time intervals and assigning the timecode to the different time intervals.

17. The computer program product of claim 16, further comprising:

in response to receiving the real-time broadcast, automatically time delaying the real-time broadcast by entering the audio content and the video content associated with the real-time broadcast into a time delay system, wherein a degree of the time delaying is dependent on an amount of time for automatically processing and presenting the real-time broadcast with the second type of content.

18. The computer program product of claim 15, wherein determining whether the parsed media content includes the first type of content, further comprises:

comparing the first type of content to an electronic corpus of terms and phrases; and determining whether the first type of content matches at least one term from the electronic corpus of terms and phrases.

19. The computer program product of claim 15, wherein automatically determining a context associated with the first type of content further comprises:

using the speech-to-text and the natural language processing algorithms to identify parts of surrounding text and speech immediately preceding and following the first type of content for clarifying a meaning of the first type of content.

20. The computer program product of claim 15, wherein automatically replacing the first type of content in the parsed media content with the second type of content further comprises:

determining a tone associated with the audio content of the first type of content;

determining a start time and an end time associated with the audio content of the first type of content;

generating a speech including the second type of content that matches the determined tone associated with the audio content of the first type of content; and automatically replacing the audio content of the first type of content with the generated speech from the second type of content, wherein the generated speech including the second type of content time-matches a length of the audio content of the first type of content based on the determined start time and the determined end time.

\* \* \* \* \*